United States Patent [19]

Sakai

[11] Patent Number: 4,513,029
[45] Date of Patent: Apr. 23, 1985

[54] SEA WATER ANTIFOULING METHOD

[75] Inventor: Takaaki Sakai, Suita, Japan

[73] Assignee: Osaka Suda Co. Ltd., Osaka, Japan

[21] Appl. No.: 514,786

[22] Filed: Jul. 18, 1983

[30] Foreign Application Priority Data

Jul. 16, 1982 [JP] Japan ................. 57-124739

[51] Int. Cl.$^3$ .............................. B05D 5/04
[52] U.S. Cl. ................. 427/204; 106/15.05; 106/84; 427/397.8; 428/446
[58] Field of Search ............ 427/397.8, 204; 428/453, 446; 106/74, 15.05, 84

[56] References Cited

U.S. PATENT DOCUMENTS 2,114,166  4/1936  Leeuw ................... 106/84
3,669,699  6/1972  Doi et al. .............. 106/74

Primary Examiner—Lorenzo B. Hayes
Attorney, Agent, or Firm—Sherman & Shalloway

[57] ABSTRACT

A method for preventing fouling of a structure which may be or is contacted with sea water, which comprises applying to same a composition composed of (a) an alkali silicate as a binder,
(b) about 15 to about 400% by weight, based on the amount of $SiO_2$ in component (a), of active magnesium oxide having an iodine adsorption of about 30 to about 300 mg.I/g.MgO,
(c) 0 to less than 15% by weight, based on the total amount of components (b) and (c), of calcium sulfite, and
(d) 0 to about 900% by weight, based on the total amount of components (b) and (c), of at least one member selected from the group consisting of metallic zinc and inorganic zinc compounds.

11 Claims, No Drawings

SEA WATER ANTIFOULING METHOD

This invention relates to an anti-fouling coating composition containing an alkali silicate as a binder. The invention also relates to a method of preventing fouling of a structure which may be or is contacted with sea water, such as gas buoys, mooring buoys, floating piers, floating breakwaters, sea water collecting and discharging pipes for cooling and other purposes and other sea water passages to which marine organisms such as organisms belonging to the families Annelida, Tentaculate, Mollusca, Arthropoda and Prochordata attach themselves.

More specifically, this invention relates to an anti-fouling coating composition for a structure which may be or is contacted with sea water, said composition being composed of (a) an alkali silicate as a binder, (b) about 15 to about 400% by weight, based on the amount of $SiO_2$ in component (a), of active magnesium oxide having an iodine adsorption of about 30 to about 300 mg.I/g.MgO, (c) 0 to less than 15% by weight, based on the total amount of components (b) and (c), of calcium sulfite, and (d) 0 to about 900% by weight, based on the total amount of components (b) and (c), of at least one member selected from the group consisting of metallic zinc and inorganic zinc compounds.

This invention also pertains to a method of preventing fouling of a structure which may be or is contacted with sea water, which comprises applying the aforesaid antifouling coating composition to at least that portion of said structure which may be or is contacted with sea water thereby preventing fouling marine organisms from attaching themselves to that portion.

In recent years, with an advance in marine exploitation in coastal sea zones, large marine structures and other like structures which may be or are contacted with sea water have been constructed or installed in increasing numbers. In addition to corrosion by sea water, these structures undergo fouling by marine organisms which attach themselves to the sea water-contacting portions. It has been desired therefore to develop an effective method for preventing such fouling. When marine organisms attach themselve to, and grow on, structures which may be or are contacted with sea water, for example, structures bays or ports such as nautical marks, gas buoys, mooring buoys, floating piers, floating waterbreaks and floating docks; restaurants and hotels in moored ships, moored floating fishing structures, and other structures for recreational use; and fish-preserving structures for cultivation, fixed fishing nets, and other similar structures for fishery, they will undergo accelerated corrosion, or sink owing to an increase in weight, or become unstable in balance. When sea water is utilized for cooling and other purposes in various facilities, factories, and power plants in coastal areas, fouling marine organisms adhere and grow in sea water collecting and discharging pipes and other water passageways and channels to an extent of several tens of centimeters in an extreme case, and cause various damages such as a decrease in the effective area of water passageway, an increase in flowing resistance, and clogging of screens used to remove floating solids.

In the past, it was the practice to spray sodium hypochlorite or chlorine-containing water on such a marine structure in order to prevent damages by fouling marine organisms. This method, however, inevitably caused environmental pollution, and it is not the general practice to coat such a structure with a coating composition containing an antifouling agent and allow an effective amount of the antifouling agent to dissolve out from the composition whereby fouling marine organisms are killed or repelled.

Ship bottom paints utilized as antifouling coating compositions contain copper suboxide, tetramethylthiuram sufide, zinc dimethyldithiocarbamate, triphenyltin hydroxide, tripenyltin acetate, triphenyltin chloride, etc. as antifouling agents. These antifouling agents, however, have strong toxicity. The above-exemplified organic tin compounds and other antifouling agents show an $LD_{50}$ of not more than 1,000 mg/kg in oral administration to mice (after 24 hours) and their adverse effects on other living organisms can by no means be ignored. Moreover, they are likely to cause secondary marine pollution. Since the aforesaid method is based on the principle that fouling is prevented by dissolving out the antifouling agents in effective concentrations sufficient for killing or repelling fouling marine organisms, it is difficult in practice to control the rate of dissolving of the antifouling agent. The duration of the antifouling effect is essentially short because the content of the antifouling agent decreases as it dissolves out. Furthermore, since these antifouling coating compositions are used for structures which may be or are contacted with sea water, they are required to have high sea water resistance and adhesion strength which are sufficiently durable to sea water and waves.

The present inventors have made investigations in order to develop a new type of an antifouling coating composition for the above-exemplified sea water-contacting structures, which meets the above requirement and can overcome the aforesaid troubles of secondary pollution and poor durability which the conventional antifouling compositions essentially have. Consequently, they have succeeded in developing an inorganic antifouling coating composition which is quite free from any antifouling agent causing marine pollution, shows satisfactory adhesion strength and sea water resistance, and can exhibit an excellent antifouling effect against fouling marine organisms.

The investigations of the present inventors have led to the discovery that an inorganic composition consisting essentially of (a) an alkali silicate as a binder and (b) about 15 to about 400% by weight, based on the amount of $SiO_2$ in component (a), of active magnesium oxide having an iodine adsorption of about 30 to about 300 mg of iodine per gram of MgO (to be expressed as about 30-about 300 mg.I/g. MgO) shows an excellent antifouling effect against fouling marine organisms in spite of not containing a component generally called an antifouling agent, and has excellent sea water resistance and satisfactory adhesion strength with respect to a structure which may be or is contacted with sea water.

No exact mechanism by which this unexpected result is obtained has been elucidated, but as experimentally shown in the Examples and Comparative Examples given hereinbelow, the composition of this invention is a new type of antifouling composition which does not cause environmental pollution, and has excellent water resistance, sea water resistance, adhesion to substrates, and coatability and an outstanding antifouling effect against marine organisms which may cause fouling.

The present inventors discovered, and disclosed in Japanese Laid-Open Patent Publication No. 56364/1982 (laid-open on Apr. 3, 1982), that a self-curable inorganic composition comprising (a) an alkali silicate and a curing agent composed of (c) calcium sulfite and (b) 15 to 500% by weight, based on the amount of SiO2 in component (a), of active magnesium oxide having an iodine adsorption of 30 to 300 mg.I/g.MgO has excellent operability, water resistance, weather resistance and surface hardness and particularly exhibits an excellent result in boiling water resistance and heat resistance. The above patent document gives no description about the antifouling effect of this composition against fouling marine organisms, and the inventors themselves did not at all notice such an unexpected antifouling effect of this composition. In addition, the above patent document gives no disclosure which can suggest such a new use of the composition.

It has now been found that a composition consisting essentially of the aforesaid components (a) and (b), and optionally containing the component (c) and/or the component (d), which is quite free from an antifouling agent that may cuase secondary pollution exhibits an outstanding durable antifouling effect against marine organisms fouling sea water-contacting structures, and has satisfactory adhesion strength and sea water resistance durable to waves.

It has also been found that the composition of this invention exhibits a particularly excellent antifouling effect against fouling marine organisms of the family Mytilidae, such as *Mytilus edulis* and *Mytilus galloprovincialis*, which occur widely in coastal areas throughout the world except cold sea areas at low temperatures.

It has further been found that the antifouling effect of the composition of this invention can be increased by coating it on a sea water-contacting structure, applying glass beads to the coated surface before it is fully cured, and allowing the coated surface to cure.

It is an object of this invention therefore to provide an antifouling coating composition for a structure which may be or is contacted with sea water.

Another object of this invention is to provide an antifouling method utilizing the aforesaid composition.

The above and other objects and advantages of this invention will become more apparent from the following description.

The antifouling coating composition of the invention contains the following components (a) and (b) as essential components.

(a) An alkali silicate as a binder.
(b) Active magnesium oxide having an iodine adsorption of about 30 to about 300 mg.I/g.MgO in an amount of about 15 to about 400% by weight based on the amount of SiO2 in component (a).

Examples of the alkali silicate (a) include sodium silicate, potassium silicate, lithium silicate, quaternary ammonium silicate, and mixtures of two or more of these. The solids content of the alkali silicate can be properly selected, and is, for example, about 15 to about 50% by weight.

The active magnesium oxide (b) is commercially available. Methods for its production are also known. For example, it can be produced by calcining basic magnesium carbonate, magnesium carbonate, magnesium hydroxide, etc. at a temperature of, for example, about 300 to about 900° C., and pulverizing the calcination product. More specifically, the desired active magnesium oxide can be obtained, for example, by pulverizing the aforesaid starting magnesium compound to a size of, for example, 100 microns or below, calcining it in a rotary kiln or another suitable calcining apparatus, and pulverizing the calcination product in a pebble mill or another suitable pulverizing device, and as desired, adjusting the particle size of the product by sieving or otherwise.

In the present invention, active magnesium oxide having an iodine absorption of about 30 to about 300 mg.I/g.MgO is selected from such active magnesium oxide products. When the iodine adsorption is smaller than the lower limit of the above-specified range, its curing action on the component (a) tends to be insufficient, and the sea water resistance of the resulting composition is reduced. On the other hand, when the iodine adsorption is larger than the upper limit, the curing action on the component (a), and particularly, the rate of the curing reaction, become too great, and gellation occurs within a very short period of time during mixing of the components, leading to very poor operability in a coating operation.

The amount of the active magnesium oxide (b) is about 15 to about 400% by weight, preferably about 30 to about 300% by weight. When the amount of the active magnesium oxide (b) is larger than the specified upper limit, the operability of the coating composition during a coating operation becomes poor. If it is smaller than the specified lower limit, the curing action on the component (a) is insufficient, and the sea water resistance of the resulting composition is reduced. The amount of component (b) is therefore selected within the above-specified range.

The antifouling coating composition of this invention may further contain calcium sulfite (c). The amount of component (c) is less than 15% by weight based on the total weight of components (b) and (c). This means that active magnesium oxide is present in a major proportion exceeding 85% by weight based on the total amount of components (b) and (c). When the amount of calcium sulfite (c) is larger than 15% by weight based on the total amount of (b) and (c), chalking will occur in a coated film of the resulting composition during long-term contact with sea water and the anti-fouling effect of the resulting composition is not durable. Hence, the amount of component (c) which may optionally be used in less than 15% by weight based on the total weight of components (b) and (c). The conjoint use of calcium sulfite (c) serves to increase the adhesion of the coating composition to a substrate further. The preferred amount of component (c) is about 5 to less than 15% based on the total weight of components (b) and (c).

The antifouling coating composition of this invention may further contain (b) at least one member selected from the group consisting of metallic zinc and inorganic zinc compounds. The amount of component (d) is 0 to about 900% by weight, preferably 0 to about 300% by weight, based on the total weight of components (b) and (c). The component (d) serves to increase the adhesion of the resulting coating composition to a wet substrate such as a wet concrete surface. When the amount of component (d) exceeds about 900% by weight, the sea water resistance of the antifouling coating composition tends to be reduced. Hence, it is used in an amount of up to about 900% by weight.

Examples of the inorganic zinc compounds as component (d) are zinc oxide, zinc carbonate and zinc sulfate.

The antifouling coating composition of this invention may further contain other auxiliary additives such as fillers, dispersing agents, coloring agents, thickeners, antifoamers and sedimentation inhibitors.

Specific examples of the fillers are inorganic or organic powdery or fibrous fillers such as talc, kaolin, calcium carbonate, asbestos and pulp.

Specific examples of the coloring agents are various inorganic pigments and dispersible organic pigments, such as titanium white, chromium oxide, cobalt oxide, white lead, litharge, red iron oxide, ultramarine, and molybdenum red.

Examples of the dispersants are sodium hexametaphosphate, polyoxyethylene alkyl phenyl ethers, and naphthalene sulfonic acid condensate.

Examples of the thickeners are poly(sodium acrylate), poly(ammonium acrylate) and hydroxyethyl cellulose.

Examples of the antifoamers are polymethylsiloxane and sorbitol derivatives.

Examples of the sedimentation inhibitors are bentonite, mica and silica gel.

The amounts of these auxiliary additives may be varied widely, and are, for example, not more than about 85% by weight.

The composition of this invention can be prepared by mixing the essential components (a) and (b), and optional component (c) and/or component (d) and/or the other additives. There is no particular restriction on the method of mixing these components. For example, liquid substances can be most easily mixed by using a high-speed rotary stirrer, and powdery substances can be mixed by using such a suitable mixing devices as a static mixer and a ribbon blender.

The present invention also provides a method for preventing fouling of a structure which may be or is contacted with sea water by using the antifouling composition of this invention.

More specifically, the present invention provides a method for preventing fouling of a structure which may be or is contacted with sea water, which comprises coating an antifouling coating composition composed of (a) an alkali silicate as a binder, (b) about 15 to about 400% by weight, based on the amount of $SiO_2$ in component (a), of active magnesium oxide having an iodine adsorption of about 30 to about 300 mg.I/g.MgO, (c) 0 to less than 15% by weight, based on the total amount of components (b) and (c), of calcium sulfite, and (d) 0 to about 900% by weight, based on the total amount of components (b) and (c), of at least one member selected from the group consisting of metallic zinc and inorganic zinc compounds, on at least that portion of said structure which may be or is contacted with sea water, thereby preventing fouling marine organisms from attaching themselves to said contacting portion.

Examples of the above structures are structures in bays and ports, structures for recreational use, structures for fishery, and structures located on coastal areas, which have already been exemplified hereinabove.

Examples of substrates which constitute the contacting portions of the above structures are substrates made of inorganic materials such as plates, pillars and pipes of concrete, stone, slates, calcium silicate, and metallic substrates such as plates, pillars and pipes of such metals as aluminum, iron and stainless steel.

The coating treatment of the aforesaid structures can be carried out by using any desired known means capable of coating the composition of this invention on the structures. For example, spray coating, roller coating, brush coating, like can be used. Since the antifouling coating composition of this invention is self-curable at room temperature, it cannot be stored for a long period of time after it is prepared. It is advisable therefore to store the components (a) and (b) and components (c) and/or (d) separately, and mix them at or near a job site just prior to application. After the coating treatment, the coated surface may be allowed to cure by itself. If desired, the coated structure may be heated by suitable heating means such as hot air and infrared rays in the later stage of curing or after curing to shorten the aging time or to improve the properties of the coated film further.

The thickness of the coated layer is properly selected, and is, for example, about 20 $\mu$m to about 1 mm.

In performing the antifouling method of this invention, the antifouling effect of the coating composition against fouling marine organisms can be further increased by applying glass beads to the surface of the coated layer before the coated layer is completely cured. There is no restriction on the method of applying glass beads, and, for example, spraying, dusting and other suitable means can be used. After application of glass beads to the surface of the coated layer, the curing of the coating composition is completed to bond the glass beads firmly and uniformly to the surface of the coated layer.

The particle size of the glass beads used may be properly chosen. It is, for example, 50 $\mu$m to about 1.5 mm. Since the adhesion of the glass beads to the composition of this invention is good, it is not necessary to treat the surface of the glass beads with a coupling agent, although this treatment may be performed as required. There is no particular restriction on the amount of the glass beads used, and it is, for example, about 100 g to about 500 g per m$^2$ of the coated area.

The antifouling coating composition of this invention for structures which may be or are contacted with sea water exhibits an excellent antifouling effect against marine organisms which will foul such structures. It can exhibit an especially marked effect in controlling fouling marine organisms of the family Mytilidae, such as *Mytilus edulis* and *Mytilus galloprovincialis*.

The antifouling coating composition of this invention shows an excellent antifouling effect against fouling marine organisms in spite of the fact that it does not contain what is called an antifouling agent. Unlike organic antifouling coating compositions containing a soluble antifouling agent composed of an organic film-forming component, the composition of this invention is substantially inorganic, and has many excellent advantages. Among such advantages are:

(i) It exhibits an excellent antifouling effect without the trouble of secondary pollution by antifouling agents, and this effect is durable.

(ii) It is a substantially inorganic composition which is water-soluble and odorless before application and curing. This offers the advantage that water can be used in diluting the composition, washing the coating devices, etc. Furthermore, even when coating is done in a closed environment, there is no likelihood of generating odoriferous and inflammable or combustible gases. Hence, this composition has excellent operational safety and hygienic safety in handling and application.

(iii) It has very strong adhesion to a cement substrate such as a concrete wall and can be coated on a wet surface. Even when the surface of an article to be coated has a high water content, sufficient adhesion strength can be retained without trouble in the coating operation. To apply general organic paints, a surface to be coated should be dried fully, and a considerable amount of labor is required for preparing a substrate surface before coating. Such preparation of substrate surfaces is not required in applying the coating composition of this invention. Accordingly, the operation of drying a substrate surface can be omitted, and no primer needs to be applied to the surface. The number of coating operations can therefore be reduced, and the coating composition can be applied very easily within a shortened period of time.

(iv) It is self-curable at room temperature, and does not particularly require heat-treatment. It can be easily coated at a job site to form a cured coated film. Heating for curing can be omitted.

(v) An inorganic coated film formed from the coating composition of this invention is a porous film having excellent permeability to water and steam. It is free from any likelihood of blistering or peeling.

The following examples illustrate the present invention in greater detail.

The various properties shown in these examples were measured and evaluated by the following methods.

1. Water resistance

A sample coating composition was coated to a thickness of about 200 μm on a glass-reinforced cement plate (5×75×150 mm), and then aged for 24 hours at a temperature of 20° C. and a relative humidity of 60% to obtain a test sample. The test sample was immersed in water for 720 hours, and after withdrawal from it, the surface condition of the coated film was observed with the naked eyes for chalking, blistering and peeling in accordance with the following ratings conforming to Standards for Evaluation of Paint Film (Japan Paint Inspecting Association, 1970).

(1) Chalking

By using a chalking tester stipulated in JIS K-5516, 5.17.4, a photographic paper was press-bonded to the coated surface, and the extent of adhesion of the removed powder to the photographic paper was compared with a standard evaluation photograph and expressed by points. Where there was no chalking, the point is 10. Larger points mean better chalking resistance.

(2) Blistering

A sample free from blisters was rated as 10 points. Other samples were rated in accordance with the following table by a combination of the overall area of blistered portions and the size (average diameter) of blisters.

| Area (%) | Size (m/m) | | | | |
|---|---|---|---|---|---|
| | <0.1 | 0.2–0.5 | 0.6–1 | 2–3 | >4 |
| <0.5 | 8-VS | 8-S | 8-M | 8-L | 8-VL |
| 0.6–5 | 6-VS | 6-S | 6-M | 6-L | 6-VL |
| 6–10 | 4-VS | 4-S | 4-M | 4-L | 4-VL |
| 11–30 | 2-VS | 2-S | 2-M | 2-L | 2-VL |
| >31 | 0-VS | 0-S | 0-M | 0-L | — |

(3) Peeling

A sample free from peeling was rated as 10 points. Other samples were rated by the overall area of peeled portions in accordance with the following table.

| Point | 9 | 8 | 6 | 4 | 2 | 0 |
|---|---|---|---|---|---|---|
| Area (%) | <0.5 | 0.6–2 | 3–5 | 6–10 | 11–30 | >31 |

2. Salt water resistance

A test sample prepared in the same way as in 1. Water resistance was tested. The test sample was immersed for 720 hours in artificial sea water stipulated in JIS K-2510, and after withdrawal from it, the surface condition of the coated film was observed with the naked eyes for the various defects shown in 1 above in accordance with Standards for Evaluation of Paint Film.

3. Adhesion

A sample coating composition was coated to a thickness of about 200 μm on concrete plates (25×75×75 mm) having a water content of 5% and 80% respectively, and aged for 24 hours at a temperature of 20° C. and a relative humidity of 60% to obtain test samples. Each test sample was immersed for 240 hours in the same artifical sea water as used in 2 above, and after withdrawal from it, its adhesion strength (kg/cm$^2$) was measured in accordance with a planar surface pulling test method stipulated in JIS A-6909. Larger adhesion stgrength values mean higher adhesion.

4. Pot life (coatability)

The components for forming a coating composition were mixed in a constant temperature chamber at 20° C., and every 30 minutes, the flow-out time by a Ford cup for paints was measured in accordance with JIS K-5402. The time which elapsed until the coating composition no longer flowed out from the cup was defined as the pot life (hours). The coatability of the composition is unsatisfactory when this time is too short. The perferred pot life is at least about one hour.

5. Antifouling ability (the ability to prevent adhesion of marine organisms)

A sample coating composition was coated to a thickness of about 200 μm on a glass-reinforced cement plate (5×1,000×1,000 mm), and aged for 24 hours at a temperature of 20° C. and a relative humidity of 60% to obtain a test sample. The test sample was immersed for 2 years at a depth of about 1 meter below the sea surface in a natural sea zone where fouling marine organisms (mainly those of the family Mytilidae, such as *Mytilus edulis* and *Mytilus galloprovincislis*), lived. The weight of these marine organisms which attached themselves per unit area of the cement plate was measured. The average value (g/m$^2$) of the measured values at three points was calculated.

In the following examples, the tests were carried out in three places, i.e. Osaka Bay, Japan; Matsuyama offing of Seto Inland Sea, Japan; and Kurashiki offing of Seto Inland Sea, Japan.

EXAMPLES 1 TO 8, COMPARATIVE EXAMPLES 1 TO 8 AND CONTROL

Coating compositions were prepared from the ingredients shown in Table 1, and subjected to the various tests described above.

In Examples 7 and 8, spherical glass beads having an average particle diameter of about 100 μm (Example 7) and about 150 μm (Example 8) were applied to the wet coated surface in an amount of 150 g (Example 7) and 300 g (Example 8) per m$^2$ of the coated surface. Otherwise, the test samples were prepared as shown above.

In Table 1, the parenthesized figures for MgO show the amounts of iodine adsorption. Sodium silicate used contained 30% by weight of $SiO_2$ and 10% by weight of $Na_2O$ and had a solids content of 40% by weight. Potassium silicate used contained 27% by weight of $SiO_2$ and 13% by weight of $K_2O$ and had a solids content of 40% by weight.

In Table 1, numerals showing "safety" are $LD_{50}$ values in an acute toxicity test by oral administration to mice.

In Table 1, (b)''' and (b)'''' are $Na_2SiF_6$ and $Al_3P_5O_{10}$ which are known curing agents for alkali silicates.

The test results are summarized in Table 2.

TABLE 1

| | Ingredients | | Example 1 | 2 | 3 | 4 | 5 | 6 | 7 | 8 |
|---|---|---|---|---|---|---|---|---|---|---|
| Parts by weight | Na silicate | | | 100 | 100 | | | 100 | | 100 |
| | K silicate | | 100 | | | 100 | 100 | | 100 | |
| % by weight based on $SiO_2$ in component (a) | (b)' MgO(20) | | | | | | | | | |
| | (b) MgO(150) | | 220 | 150 | 60 | 290 | 100 | 300 | 37 | 60 |
| | (b)'' MgO(350) | | | | | | | | | |
| | (b)''' $Na_2SiF_6$ | | | | | | | | | |
| | (b)'''' $Al_3P_5O_{10}$ | | | | | | | | | |
| % by weight based on (b) + (c) | (c) $CaSO_3$ | | | | 10 | 13 | 10 | 10 | | 10 |
| | (d) Zn | | | 100 | | | 133 | | | |
| | (d) ZnO | | | | | | | 25 | | |
| % by weight based on the composition | Pigment $TiO_2$ | | 17 | 12 | 21 | 17 | 17 | 7 | 28 | 21 |
| | Filler $CaCO_3$ | | 13 | 12 | 16 | 9 | 9 | 9 | 11 | 16 |

| | Ingredients | Comparative Example 1 | 2 | 3 | 4 | 5 | 6 | 7 | 8 | 9 | 10 | Control |
|---|---|---|---|---|---|---|---|---|---|---|---|---|
| Parts by weight | Na silicate | 100 | 100 | 100 | 100 | | | 100 | 100 | Commercially available antifouling coating composition of the acrylic resin type containing 40% of copper suboxide and triphenyltin hydroxide as antifouling agents | Commercially available antifouling coating composition of the vinyl chloride resin type containing 15% of copper suboxide and triphenyltin hydroxide as antifouling agents | Non-coated glass-reinforced cement plate for antifouling test |
| | K silicate | | | | | 100 | 100 | | | | | |
| % by weight based on $SiO_2$ in component (a) | (b)' MgO(20) | | | | 300 | | | | | | | |
| | (b) MgO(150) | | | | | | 74 | 10 | 600 | | | |
| | (b)'' MgO(350) | | | | | 67 | | | | | | |
| | (b)''' $Na_2SiF_6$ | 175 | | | | | | | | | | |
| | (b)'''' $Al_3P_5O_{10}$ | | 167 | | | | | | | | | |
| % by weight based on (b) + (c) | (c) $CaSO_3$ | | | 100 | 10 | 10 | 50 | | | | | |
| | (d) Zn | | | | | | 100 | | | | | |
| | (d) ZnO | | | | | | | | | | | |
| % by weight based on the composition | Pigment $TiO_2$ | 7 | 19 | 19 | 15 | 24 | 13 | 26 | 9 | | | |
| | Filler $CaCO_3$ | 7 | 10 | 14 | 11 | 13 | 13 | 21 | 6 | | | | by weight.

TABLE 2

| | Properties | Example 1 | 2 | 3 | 4 | 5 | 6 | 7 | 8 |
|---|---|---|---|---|---|---|---|---|---|
| Water resistance | Chalking | 10 | 10 | 10 | 10 | 10 | 10 | 10 | 10 |
| | Blistering | 10 | 10 | 10 | 10 | 10 | 10 | 10 | 10 |
| | Peeling | 10 | 10 | 10 | 10 | 10 | 10 | 10 | 10 |
| Salt water resistance | Chalking | 10 | 10 | 10 | 10 | 10 | 10 | 10 | 10 |
| | Blistering | 10 | 10 | 10 | 10 | 10 | 10 | 10 | 10 |
| | Peeling | 10 | 10 | 10 | 10 | 10 | 10 | 10 | 10 |
| Adhesion | at a water content of 5% (kg/cm$^2$) | 2.0 | 1.4 | 19.5 | 17.8 | 15.6 | 17.5 | 3.1 | 20.3 |
| | at a water content of 80% (kg/cm$^2$) | 1.7 | 1.1 | 13.7 | 14.4 | 15.5 | 17.0 | 2.5 | 13.1 |
| Coatability | Pot life (hours) | 2.0 | 3.0 | 3.0 | 1.0 | 2.5 | 2.0 | 3.5 | 3.0 |
| Antifouling property | Amount of marine organism (Mytilidae) attached (g/m$^2$) | 480 | 340 | 150 | 180 | 60 | 270 | 50 | 60 |
| Safety | $LD_{50}$ (mg/kg) | — | — | 55000 | 55000 | 53000 | 53000 | — | — |

| | Properties | Comparative Example 1 | 2 | 3 | 4 | 5 | 6 | 7 | 8 | 9 | 10 | Control |
|---|---|---|---|---|---|---|---|---|---|---|---|---|
| Water resistance | Chalking | Coated film flowed away | 2 | 2 | Coated film flowed away | 10 | 8 | 2 | 10 | 8 | 8 | |
| | Blistering | | 2-S | 4-VS | | 10 | 10 | 10 | 10 | 10 | 10 | |
| | Peeling | | 6 | 8 | | 10 | 10 | 2 | 10 | 10 | 10 | |
| Salt water resistance | Chalking | Coated film flowed away | 2 | 2 | Coated film flowed away | 10 | 6 | 2 | 10 | 8 | 8 | |
| | Blistering | | 2-S | 6-VS | | 10 | 10 | 10 | 10 | 6-M | 4-M | |
| | Peeling | | 4 | 8 | | 10 | 10 | 2 | 10 | 6 | 6 | |
| Adhesion | at a water content of 5% (kg/cm$^2$) | 0 | 0.2 | 9.8 | 0 | 2.7 | 2.8 | 0.1 | 0.9 | 21.0 | 20.6 | |
| | at a water content of 80% (kg/cm$^2$) | 0 | 0 | 4.7 | 0 | 1.3 | 1.0 | 0.1 | 0.5 | 0.2 | 0.3 | |

TABLE 2-continued

| | | | | | | | | | | | | |
|---|---|---|---|---|---|---|---|---|---|---|---|---|
| Coatability | Pot life (hours) | 12.0 | 0.5 | 2.5 | 12.0 | below 0.1 | 1.5 | 6.0 | below 0.1 | — | — | |
| Antifouling property | Amount of marine organism (Mytilidae) attached (g/m$^2$) | 22900 | 18000 | 6700 | 16300 | 1250 | 270 | 11700 | 2100 | 1430 | 2750 | 44300 |
| Safety | LD$_{50}$ (mg/kg) | — | — | — | — | — | — | — | — | 2200 | 1600 | |

What is claimed is:

1. A method for preventing fouling of a structure which may be in contact with sea water, which comprises coating an antifouling coating composition composed of
   (a) an alkali silicate as a binder,
   (b) about 15 to about 400% by weight, based on the amount of SiO$_2$ in component (a), of active magnesium oxide having an iodine adsorption of about 30 to about 300 mg.I/g.MgO,
   (c) 0 to less than 15% by weight, based on the total amount of components (b) and (c), of calcium sulfite, and
   (d) 0 to about 900% by weight, based on the total amount of components (b) and (c), of at least one member selected from the group consisting of metallic zinc and inorganic zinc compounds, on at least that portion of said structure which may be contacted with sea water, thereby preventing fouling marine organisms from attaching themselves to said contacting portion.

2. The method of claim 1 wherein the marine organisms are those belonging to the family Mytilidae.

3. The method of claim 1 wherein glass beads are applied to the surface of the coated layer.

4. The method of claim 1 wherein the amount of (c) is from about 5 to less than 15%.

5. The method of claim 1 wherein the amount of (d) is from 0 to about 300%.

6. The method of claim 1 wherein the amount of (b) is from 30 to about 300%.

7. A method for preventing fouling of a structure which may be in contact with sea water which comprises coating an antifouling coating composition composed of
   (a) an alkali silicate as a binder,
   (b) about 15 to about 400% by weight, based on the amount of SiO$_2$ in component (a) of active magnesium oxide having an iodine adsorption of about 30 to about 300 mg I/g. MgO,
   (c) from about 5 to less than 15% by weight, based on the total amount of components (b) and (c), of calcium sulfite, and
   (d) 0 to about 900% by weight, based on the total amount of components (b) and (c), of at least one member selected from the goup consisting of metallic zinc and inorganic zinc compounds, on at least that portion of said structure which may be in contact with sea water, thereby preventing fouling marine organisms from attaching themselves to said contacting portion.

8. The method of claim 7 wherein the marine organisms are those belonging to the family Mytilidae.

9. The method of claim 7 wherein glass beads are applied to the surface of the coated layer.

10. The method of claim 7 wherein the amount of (b) is from 30 to about 300%.

11. The method of claim 7 wherein the amount of (d) is from 0 to about 300%.

* * * * *

UNITED STATES PATENT AND TRADEMARK OFFICE
CERTIFICATE OF CORRECTION

PATENT NO. : 4,513,029
DATED : April 23, 1985
INVENTOR(S) : Takaaki Sakai

It is certified that error appears in the above-identified patent and that said Letters Patent is hereby corrected as shown below:

On the title page;

[73] Assignee - delete "Suda", insert --Soda--.

Signed and Sealed this

Third Day of September 1985

[SEAL]

Attest:

DONALD J. QUIGG

Attesting Officer     Acting Commissioner of Patents and Trademarks - Designate